(12) United States Patent
Blackburn

(10) Patent No.: US 8,104,791 B2
(45) Date of Patent: *Jan. 31, 2012

(54) PRESSURIZED GAS RELEASE MECHANISM

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/586,754

(22) Filed: Sep. 28, 2009

(65) Prior Publication Data

US 2010/0019475 A1     Jan. 28, 2010

Related U.S. Application Data

(62) Division of application No. 11/260,824, filed on Oct. 27, 2005, now Pat. No. 7,597,354.

(60) Provisional application No. 60/622,966, filed on Oct. 28, 2004.

(51) Int. Cl.
*B60R 21/26* (2006.01)

(52) U.S. Cl. .......................... 280/737; 102/531; 280/741

(58) Field of Classification Search .................. 280/737, 280/736, 741; 102/530, 531
See application file for complete search history.

(56) References Cited

U.S. PATENT DOCUMENTS

| | | | | |
|---|---|---|---|---|
| 3,567,245 A * | 3/1971 | Ekstrom | ........................ | 280/737 |
| 5,456,492 A * | 10/1995 | Smith et al. | .................... | 280/737 |
| 6,196,584 B1 * | 3/2001 | Shirk et al. | ..................... | 280/737 |
| 6,572,141 B2 | 6/2003 | Nanbu | ........................ | 280/736 |
| 6,796,580 B1 | 9/2004 | Kubo et al. | | |
| 6,830,264 B2 | 12/2004 | Al-Amin | ........................ | 280/736 |
| 6,908,104 B2 * | 6/2005 | Canterberry et al. | ......... | 280/736 |
| 6,908,106 B2 | 6/2005 | Campbell et al. | ............. | 280/741 |
| 7,293,797 B2 | 11/2007 | Nakayasu et al. | | |
| 7,588,265 B2 | 9/2009 | Blackburn | ..................... | 280/737 |
| 7,597,354 B2 * | 10/2009 | Blackburn | ..................... | 280/737 |
| 7,857,345 B1 | 12/2010 | Stevens | ........................ | 280/736 |
| 2004/0213701 A1 | 10/2004 | Hattori et al. | ................... | 422/98 |

OTHER PUBLICATIONS

Office Action U.S. Appl. No. 12/321,537, filed Jan. 22, 2009, Dated Oct. 26, 2010 (192).
Office Action U.S. Appl. No. 12/321,537, filing Date Jan. 22, 2009, Mailed Aug. 1, 2011.

* cited by examiner

*Primary Examiner* — Eric Culbreth
(74) *Attorney, Agent, or Firm* — L.C. Begin & Associates, PLLC

(57) ABSTRACT

A mechanism (10) for releasably confining pressurized fluid in a container (18) is provided. The mechanism includes a rupturable membrane (22) in fluid communication with an interior of the container (18), thereby exposing the membrane (22) to the fluid. The membrane (22) is configured to obstruct flow of the pressurized fluid when externally supported against pressure exerted by the fluid. The membrane (22) is also rupturable by pressure exerted by the fluid when not externally supported against the pressure exerted by the fluid. A support member (28) is provided for externally supporting the membrane (22) against pressure exerted by the fluid. The support member (28) is configured to be fracturable upon exposure to combustion products formed by activation of a gas generator (66) at least partially encased within the support member (28).

2 Claims, 2 Drawing Sheets

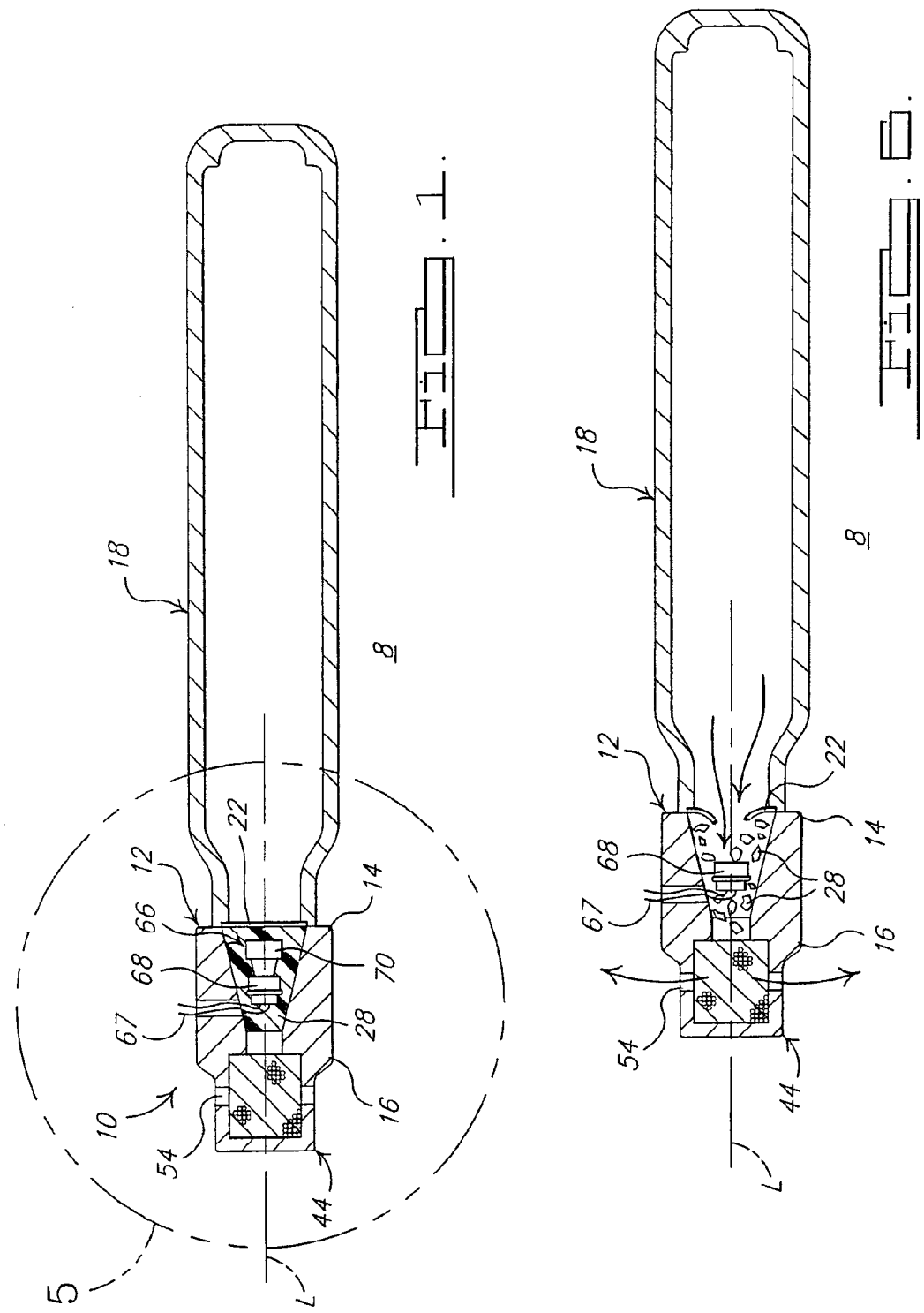

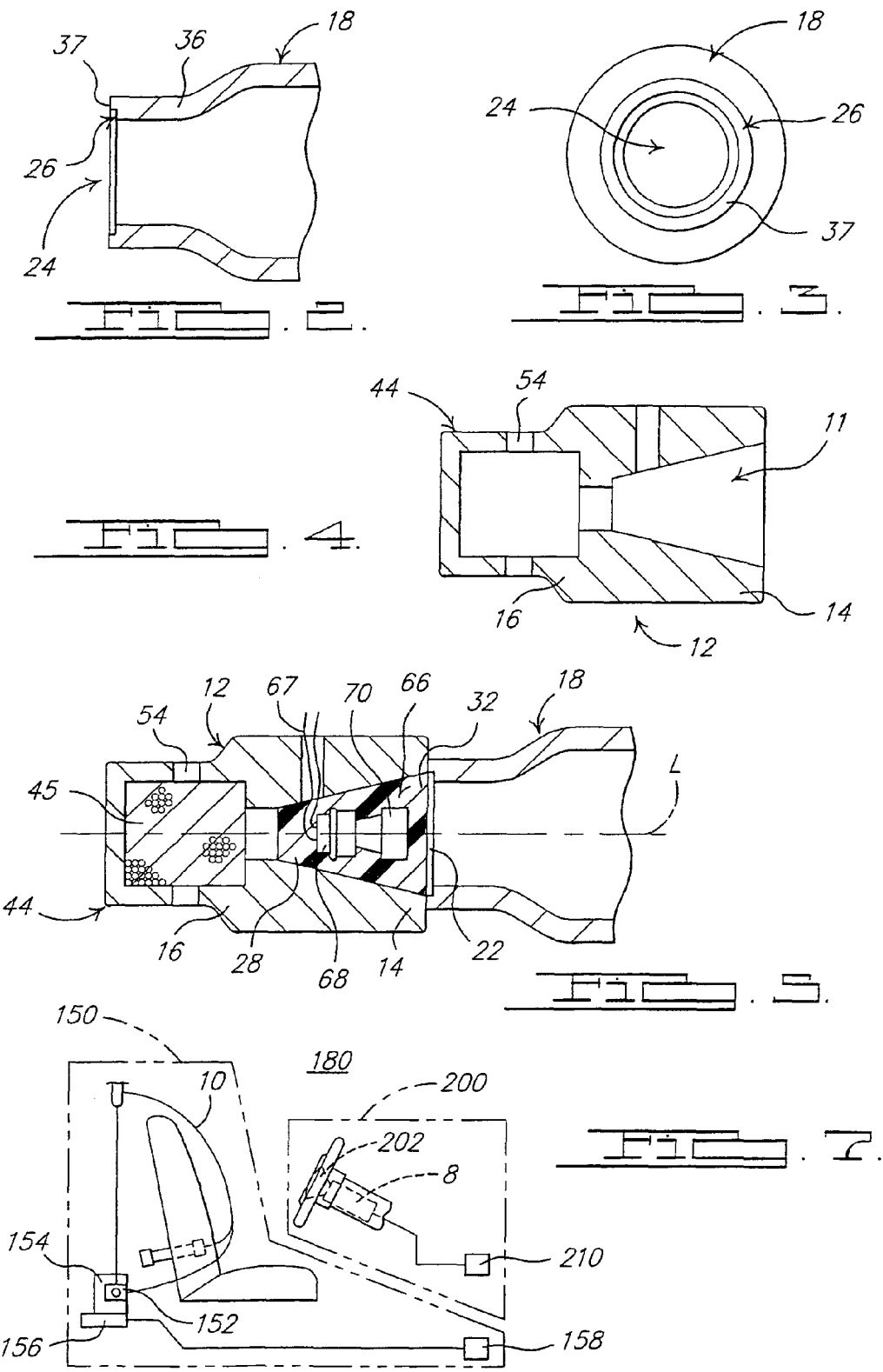

PRESSURIZED GAS RELEASE MECHANISM

CROSS-REFERENCE TO RELATED APPLICATIONS

This application is a divisional of U.S. application Ser. No. 11/260,824 filed on Oct. 27, 2005 now U.S. Pat. No. 7,597,354, which claims the benefit of U.S. Provisional Application No. 60/622,966 filed on Oct. 28, 2004, both of which are incorporated herein by reference.

BACKGROUND OF THE INVENTION

The present invention relates to inflators used to inflate air bags in an automobile occupant protection system and, more particularly, to a mechanism for releasably containing a pressurized inflation fluid in a container used in a stored gas inflator.

Inflation systems for deploying an air bag in a motor vehicle generally employ a gas generator in fluid communication with an uninflated air bag. The gas generator is typically triggered by a firing circuit when a sensor determines that vehicle acceleration has exceeded a predetermined threshold value (for example, through the use of an acceleration-responsive inertial switch.)

Air bag inflation systems often utilize a stored gas generator (or hybrid gas generator) housed within the B-pillar of a car, for example. Stored gas generators contain pressurized gas that is released to inflate the airbag upon receipt of a predetermined signal from the sensor. An ongoing challenge is to reduce the time required to release the stored gas upon a crash event. Furthermore, improved safety, simplified assembly, and reduced manufacturing costs are also ongoing concerns. Improvements in any of these areas would provide an advantage over state-of-the-art gas release systems.

BRIEF DESCRIPTION OF THE DRAWINGS

In the drawings illustrating embodiments of the present invention:

FIG. 1 is a cross-sectional view of an inflator incorporating a mechanism for releasably confining pressurized fluid in a container, in accordance with the present invention;

FIG. 2 is a partial cross-sectional view of a container for storing pressurized inflation fluid in accordance with the present invention;

FIG. 3 is an end view of the container shown in FIG. 2;

FIG. 4 is a cross-sectional view of a housing used in the embodiment of the mechanism for releasably confining pressurized fluid in a container interior shown in FIG. 1;

FIG. 5 is an enlarged view taken with the circle 5 of FIG. 1 showing a cross-sectional view of the mechanism shown in FIG. 1;

FIG. 6 is a cross-sectional view of the inflator shown in FIG. 1 showing fracturing of a support member during operation of the inflator; and FIG. 7 is a schematic view of an airbag system and a vehicle occupant restraint system incorporating an inflator using the pressurized fluid containment mechanism of the present invention.

DETAILED DESCRIPTION

FIGS. 1-6 show one embodiment of an inflator 8 incorporating a mechanism 10 for releasably containing pressurized fluid in a container, in accordance with the present invention.

Referring to FIGS. 1-3, mechanism 10 is shown secured to a gas bottle or tank 18 in which a pressurized fluid (in this case, an inflation gas) is stored. Bottle 18 has an annular wall 36 defining an opening 24, with an annular shoulder 37 extending from annular wall 36 to form an annular ledge 26 along a base portion of shoulder 37.

Referring to FIGS. 1 and 5, mechanism 10 includes a rupturable membrane 22 (for example, a burst disk) secured in fluid communication with an interior of bottle 18. Membrane 22 forms a fluid-tight barrier preventing flow of pressurized gas through or around the membrane. In the embodiment shown in FIGS. 1, 2 and 5, membrane 22 is seated along gas bottle annular ledge 26 and welded or otherwise secured thereon to obstruct flow of the pressurized fluid during normal vehicular operation. Membrane 22 is configured to obstruct flow of the pressurized fluid when externally supported against pressure exerted by the fluid by a support member 28, as described in detail below. Membrane 22 is also configured to be rupturable by pressure exerted by the fluid when not externally supported against this pressure.

Membrane 22 may be stamped or formed from any of various disks, foils, films, etc., as is known in the art. The materials and structure of the membrane will depend on the pressure of the gas sealed in bottle 12 and the desired performance characteristics of inflator 8. For example, disks made from materials and/or having structures which are relatively more or less readily ruptured may be used.

Referring to FIGS. 1, 4, and 5, in accordance with the present invention, a support member 28 abuts membrane 22 to bias the membrane against ledge 26 thereby providing s external support to the membrane against pressure exerted by fluid stored in bottle 18. As shown in FIG. 5, support member 28 is tapered from a first end 32 to a second end 34. First end 32 has a diameter slightly larger than a diameter of annular ledge 26 formed in bottle wall 36 adjacent bottle opening 24. Accordingly, support member first end 32 forms an interference fit with shoulder 37 to cover membrane 22. When support member 28 is buttressed against membrane 22, the support member supports membrane 22 against pressure exerted by pressurized gas in bottle 18, thereby preventing pressurized gas in bottle 18 from rupturing membrane 22 during normal vehicular operation.

Support member 28 may be formed from a polymeric material that decomposes in the presence of heat and, as explained below, also fractures upon contact with gases resulting from combustion of a gas generant compound. For example, support member 28 may be made from a two-part epoxy resin. The epoxy or polymeric composition used to form the support member 28 may be obtained, for example, from ITW Devcon of Danvers, Massachusetts under the trade name, "5-Minute Epoxy Resin". The primary constituents of the epoxy resin include bisphenol A diglycidyl ether resin in an amount greater than 60% by weight. The "5-Minute Epoxy Resin" may be employed with a "5-Minute Epoxy Hardener", also provided by ITW Devcon of Danvers, Mass. The primary constituents of the epoxy hardener include a mercaptan amine blend in an amount preferably ranging from 90-100% by weight. Other two-part epoxy compositions include, but are not limited to, "Epoxy Plus Resin" and "Epoxy Plus Hardener" also provided by ITW Devcon. The resin composition includes aminoethylpiperazine at about 10-30% by weight of the total composition, nonylphenol at about 10-20% by weight of the total composition, polyamide of C18 fatty acid dimmers and 1,4,8,11-tetraazacyclotetradecane-N,N',N",N'''-tetraacetic acid (TETA) at about 1-5% by weight of the total composition, and 2,4,6-Tris(Dimethylaminomethyl) phenol at about 5-10% by weight of the total composition.

The hardener composition includes bisphenol A diglycidyl ether resin at about 30-60% by weight of the total composition, an acrylate at about 1-5% by weight of the total composition, and butylated bisphenol A epoxy resin at about 30-60% by weight of the total composition. Other suitable two-part epoxies or polymers are also contemplated.

In the embodiment shown in FIGS. 1-6, support member 28 is fixed within a passage 11 formed in an elongated housing 12 secured to container 18. Housing 12 contains a first end 14, a second end 16, and passage 11 for receiving the pressurized fluid therethrough. Passage 11 extends between housing first end 14 and housing second end 16. Housing 12 may be fabricated (for example, by stamping, casting, metal-forming, or some other, suitable process) from a rigid material such as carbon steel or stainless steel. In addition, passage 11 is tapered to conform to the shape of support member 28, as described above. This enables housing 12 to brace support member 28 in a position abutting membrane 22. Shaping passage 11 in correspondence with a desired shape of support member 28 also enables the housing to be used as a mold, or vessel, to fabricate the support member within the housing.

In an alternative embodiment (not shown), the support member 28 is secured to a part of the assembly 8 other than the housing 12 (for example, to bottle 18). In another alternative embodiment (not shown), rather than securing membrane 22 to bottle 18, membrane 22 is secured within housing passage 11. In yet another alternative embodiment (also not shown), membrane 22 is secured to housing 12 outside passage 11.

Referring again to FIG. 5, a gas generator 66 is encapsulated within support member 28. Gas generator 66 includes an igniter 68 and a gas generant compound 70, all formed in a known manner, wherein the gas generant 70 is in ignitable communication with the igniter 68. To provide an ignition circuit for activating igniter 68, a pair of electrical contacts 67 or some other form of activation signal transmission medium is provided extending through support member 28 and housing 12 between gas generator 66 and an exterior of the housing. First portions of electrical contacts 67 extend outside support member 28 and housing 12 and in a known manner are connected to an appropriate electrical circuit designed to signal activation of igniter 68 in the event of a vehicle collision. Second portions of electrical contacts 67 extend into igniter to form therein part of an igniter activation circuit. In an alternative embodiment, encapsulated gas generator 66 may be activated by a radio frequency signal received by an appropriate radio-receiver circuit arrangement provided in igniter 68 prior to gas generator encapsulation.

Support member 28 may be formed within housing 12 by positioning gas generator 66 in a desired position within a portion of housing 12 machined or formed to the desired shape of support member 28, and then injecting or pouring an epoxy compound or other suitable constituent material into the portion of the housing to surround and encapsulate gas generator 66. In the case where support member 28 is formed within housing 12, the epoxy is positioned in the housing according to manufacturer instructions and then cured within housing 12. Alternatively, support member 28 may be preformed prior to insertion into the housing by encapsulating gas generator 66 outside the housing. Support member 28 with gas generator 66 enclosed therein is then inserted into housing 12 during assembly of mechanism 10.

Gas generant 70 may comprise any gas generant composition known for its utility in vehicle occupant protection systems. Co-owned U.S. Pat. Nos. 5,035,757, 5,756,929, 5,872,329, 6,077,371, 6,074,502, and 6,210,505 are incorporated herein by reference and exemplify, but do not limit gas generant compositions contemplated in accordance with the present invention.

Because the gas generant is enclosed within the encapsulation provided by support member 28, optimum combustion conditions are immediately available upon ignition of the gas generant. Under these conditions, it is believed that solid gas generants that burn efficiently at ambient pressures will burn with increased speed at efficiency at the relatively high pressures within the pressure vessel. For this reason, these gas generants may be particularly suitable for achieving the rapid gas generant burn rates desired in the present invention. Specifically, it is believed that a group of gas generants using silicone as a fuel may be particularly suitable for use in the present invention.

In one embodiment, gas generant 70 comprises a mixture of silicone as a fuel at about 10-25% by weight, and an oxidizer such as ammonium or potassium perchlorate at about 75-90% by weight. Silicone not only functions as a fuel but also functions as a binder thereby facilitating the formation of pliant cylindrical gas generant extrusions. In a particular embodiment, gas generant 70 comprises silicone as a fuel at about 10-25% by weight; a perchlorate oxidizer such as ammonium, lithium, or potassium perchlorate; and a strontium salt such as strontium nitrate or strontium carbonate as a coolant, wherein the oxidizer and coolant comprise about 75-90% by weight of the gas generant. The silicone may be purchased, for example, from General Electric or other well-known suppliers. The other gas generant constituents may be provided by suppliers or by manufacturing methods well known in the art.

In another particular embodiment, gas generant composition 70 comprises, in percents by weight, 10-25% silicone, 75-90% oxidizer, 1-30% coolant, and 1-20% of a slag-forming constituent. The oxidizer may be selected from, for example, inorganic perchlorates and nitrates such as sodium perchlorate, potassium perchlorate, ammonium perchlorate, potassium nitrate, ammonium nitrate, and phase stabilized ammonium nitrate. The coolant may, be selected from for example metal hydroxides such as aluminum hydroxide; metal carbonates such as calcium carbonate, magnesium carbonate, strontium carbonate, and sodium carbonate; and inorganic oxalates such as calcium oxalate, strontium oxalate, and ammonium oxalate. The slag-forming constituent may be selected from for example metal oxides such as aluminum oxide and iron oxide. It has been found that gas generating compositions containing silicone and a perchlorate oxidizer burn at relatively lower temperatures when a coolant, in accordance with the present invention, is added to the mixture. As a result, the cooling requirements of gas generated within the mechanism 10 can be substantially minimized while still providing sufficient heat to fracture and decompose the support member 26.

A hollow diffuser 44 is machined or otherwise formed from steel or other suitable materials, and then welded or otherwise fixed to housing second end 16. Diffuser 44 functions to distribute gas flowing from first end 14 through passage 11 to housing second end 16. A plurality of gas discharge orifices 54 is spaced about a circumference of the diffuser 44. The embodiment shown in FIGS. 1 and 5 includes four gas discharge orifices 54 evenly spaced about the circumference of the diffuser 44. The diffuser 44 may incorporate a filter 45 therein to filter combustion products and fragments of support member 28 from the inflation fluid prior to gas distribution. Any suitable metallic mesh filter or woven wire cloth may be used, many examples of which are known and obtainable from commercially available sources (for example, Wayne Wire Cloth Products, Inc. of Bloomfield Hills, Mich.) It will be appreciated that the diffuser 44 and the filter 45 may be formed in known manners. For example, the diffuser may be die cast or otherwise metal-formed, and the filter may be roll-formed to accommodate the present invention.

Upon a crash event and upon operation of the inflator or mechanism 10, the igniter 68 receives a signal from a crash sensor or accelerometer (not shown in FIGS. 1-5), for example, and then ignites gas generant 70. Because the solid gas generant is enclosed within the encapsulation formed by support member 28, optimum conditions exist for combustion of the gas generant immediately upon ignition. Thus, a relatively faster burning rate and temperature of gas generant 70 will result than would otherwise ordinarily take place. The high burn rate and temperature of the propellant typically provides for rapid formation of combustion products, contact with which decomposes and/or fractures support member 28. This removes support for the rupturable membrane and allows the gas pressure within bottle 18 to rupture membrane 22. Stored inflation fluid within bottle 18 then flows through membrane 22 and through passage 11 and past components of gas generator 66, into diffuser 44, and out of housing 12 into an airbag (not shown). Filter 45 in diffuser 44 traps fractured portions of supporting member 26 within the diffuser to prevent their entry into the airbag.

Any embodiment of the inflator described herein may be incorporated into an airbag system 200, as seen in FIG. 7. Airbag system 200 includes at least one airbag 202 and an inflator 8 coupled to airbag 202 so as to enable fluid communication with an interior of the airbag. Airbag system 200 may also be in communication with a crash event sensor 210 including a known crash sensor algorithm that signals actuation of airbag system 200 via, for example, activation of airbag igniter 68 in the event of a collision.

Referring again to FIG. 7, an embodiment of the inflator or an airbag system including an embodiment of the inflator may be incorporated into a broader, more comprehensive vehicle occupant restraint system 180 including additional elements such as a safety belt assembly, as seen in FIG. 7. Safety belt assembly 150 includes a safety belt housing 152 and a safety belt 160 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, each incorporated herein by reference. Illustrative examples of typical pretensioners with which the safety belt embodiments of the present invention may be combined are described in U.S. Pat. Nos. 6,505,790 and 6,419,177, each incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of the present invention is for illustrative purposes only, and that the various structural and operational features herein disclosed are susceptible to a number of modifications, none of which departs from the scope of the present invention as indicated in the appended claims. The preceding description, therefore, illustrates but does not limit the scope of the present invention.

What is claimed is:

1. An inflator comprising:
    a container for containing a pressurized fluid;
    a rupturable membrane for sealing an opening of the container, the rupturable membrane being positioned to obstruct flow of the pressurized fluid when supported against pressure exerted by the fluid, wherein the rupturable membrane is configured to be rupturable by pressure exerted by the fluid when not supported against pressure exerted by the fluid; and
    a support member for supporting the rupturable membrane against pressure exerted by the fluid, wherein the support member is configured to be fracturable and/or decomposable upon exposure to combustion products formed by activation of a gas generator at least partially encased within said support member, thereby removing support for the rupturable membrane and enabling rupturing of the membrane to release the pressurized fluid through the opening.

2. A vehicle occupant protection system comprising an inflator in accordance with claim 1.

* * * * *

UNITED STATES PATENT AND TRADEMARK OFFICE
CERTIFICATE OF CORRECTION

| | | |
|---|---|---|
| PATENT NO. | : 8,104,791 B2 | Page 1 of 1 |
| APPLICATION NO. | : 12/586754 | |
| DATED | : January 31, 2012 | |
| INVENTOR(S) | : Blackburn | |

It is certified that error appears in the above-identified patent and that said Letters Patent is hereby corrected as shown below:

Col. 2, Line 30;   Delete "s"

Col. 4, Line 8;   Delete "bum" and insert -- burn --

Col. 4, Line 8;   Delete "bum" and insert -- burn --

Col. 4, Line 12;   Delete "bum" and insert -- burn --

Col. 4, Line 48;   Delete "bum" and insert -- burn --

Signed and Sealed this
Third Day of April, 2012

David J. Kappos
*Director of the United States Patent and Trademark Office*